Aug. 23, 1966 S. L. YACKLE 3,268,271
CYCLIC AIR VALVE FOR PREVENTING WHEEL SKID
Filed June 1, 1964 2 Sheets-Sheet 1

INVENTOR.
Siegfried L. Yackle
BY
D.D. McGraw
His Attorney

Aug. 23, 1966         S. L. YACKLE         3,268,271
CYCLIC AIR VALVE FOR PREVENTING WHEEL SKID
Filed June 1, 1964                    2 Sheets-Sheet 2

INVENTOR.
Siegfried L. Yackle
BY
D. D. McGraw
His Attorney

United States Patent Office 3,268,271
Patented August 23, 1966

3,268,271
CYCLIC AIR VALVE FOR PREVENTING
WHEEL SKID
Siegfried L. Yackle, Milwaukee, Wis., assignor to General
Motors Corporation, Detroit, Mich., a corporation of
Delaware
Filed June 1, 1964, Ser. No. 371,543
7 Claims. (Cl. 303—82)

This invention relates to air valves and more particularly to a type of air valve used as an anti-skid device for a vehicle having an air-operated braking system.

It is an object of the present invention to provide an improved anti-skid device for use with air-operated vehicle brakes.

It is another object of this invention to provide an anti-skid device for air operated vehicle brakes that is primarily responsive to pressure levels and surges above preset pressure levels.

It is still another object of the present invention to provide a very simple device with few moving parts that will cycle very quickly to prevent a pressure surge in an air-operated braking system thereby preventing wheel lock-up.

It is a further object of the present invention to provide an improved air valve for use with air-operated vehicle braking systems that can be inserted into air braking systems of common design to prevent brake lock-up and, subsequently, skidding of the vehicle.

It is yet a further object of the present invention to provide an improved anti-skid device for air-operated vehicle braking systems that can be variably preset for installation in operative environments that differ greatly from one another.

Further objects and advantages of the present invention will be apparent from the following description, reference being had to the accompanying drawings wherein a preferred embodiment of the present invention is clearly shown.

Figure 1:
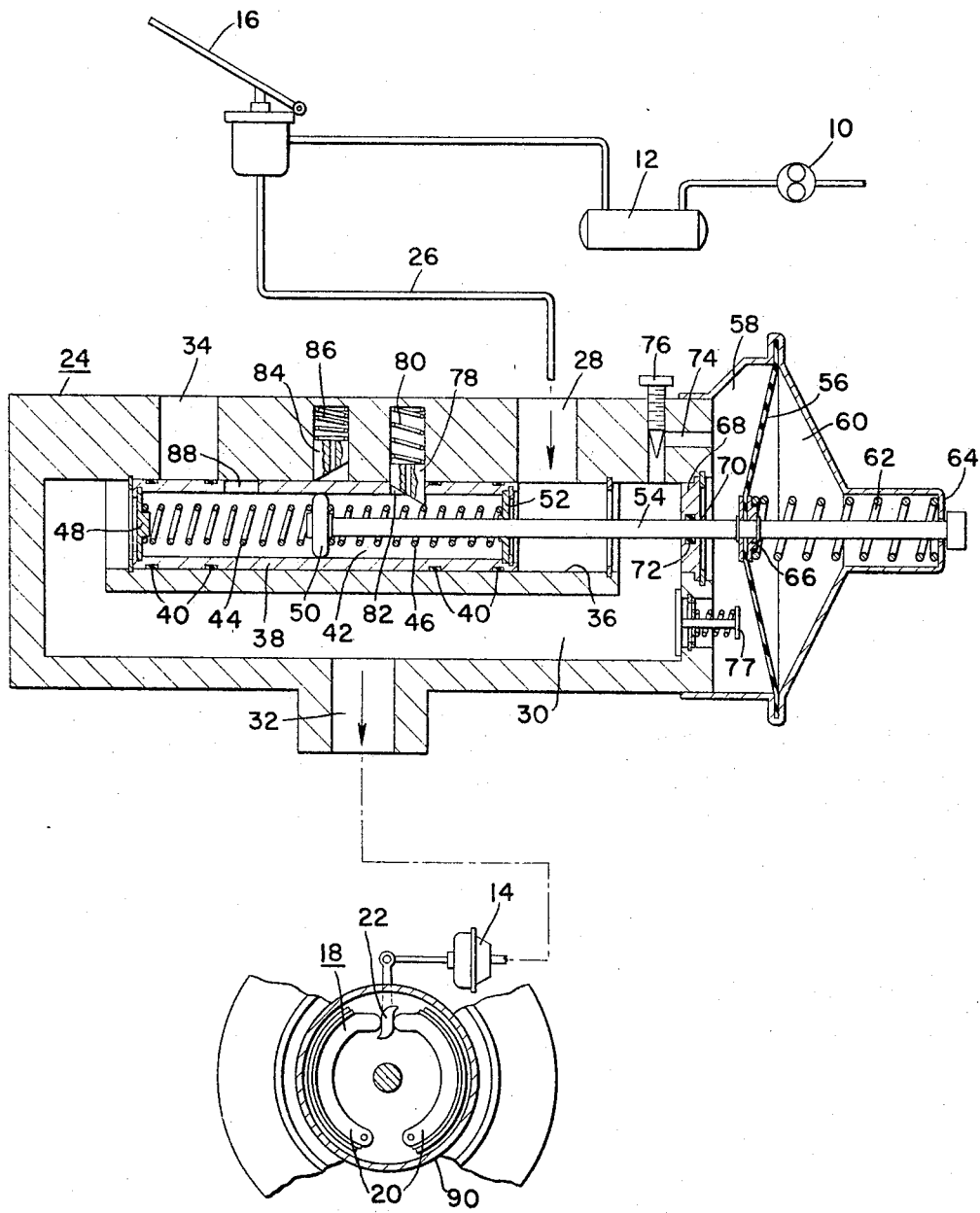
FIGURE 1 is a sectional view of the subject invention shown in a diagrammatic illustration of an air-operated vehicle braking system.

Referring now to FIGURE 1, an air pump 10 is shown providing air under pressure to an accumulator 12 that is used to pressurize a brake actuator 14 when a foot controlled valve 16 is depressed. A vehicle braking mechanism 18 is a conventional type wherein a pair of brake shoes 20 are pushed apart at one end by a lever mechanism 22 which is, in turn, operated by the brake actuator 14.

A cyclic air valve is generally designated by the numeral 24. The valve 24 is placed anywhere in an air transfer line 26 between the valve 16 and the actuator 14. Air enters the air valve 24 through an inlet 28 and pressurizes an air chamber 30. An outlet 32 from the air valve 24 allows the air pressure to be transmitted to the actuator 14. An exhaust port 34 leading to the atmosphere from the air chamber 30 provides a means for depressurizing the braking system. A cylinder 36 formed in one portion of the valve 24 houses a piston 38 which is adapted to slide translationally in the cylinder 36 to either of two positions where it seals the inlet 28 from the chamber 30 or the exhaust 34 from the chamber 30. A series of seals 40 are circumferentially disposed on the piston 38 in such a manner as to positively seal the cylinder 36 from the outlet 28 or the exhaust 34 when the piston 38 is appropriately positioned.

Within the piston 38 is a chamber 42 which houses a spring 44 and a spring 46 disposed in end-to-end relationship. One end of the spring 44 is held against a closure means 48 of the chamber 42 and the opposite end of the spring 44 is disposed against a disk or spool 50. The spring 46 is similarly positioned in the chamber 42 in that one end is held against a closure means 52 and the opposite end is held against the other side of the disk 50. The springs 44 and 46 are of equal strength and during an unpressurized condition in the braking system tend to center the disk 50 in the chamber 42.

The disk 50 is carried by a rod 54 which passes through the closure means 52 into engagement with a diaphragm 56. The diaphragm 56 forms a pressurizable chamber 58 and a non-pressurized chamber 60. A spring 62 is disposed around one end of the rod 54 and serves to bias the diaphragm 56 away from a wall 64 of the air valve 24. It should be noted that the rod 54 is in fixed relationship with respect to the diaphragm 56 and is maintained in that condition by an attaching means 66.

The rod 54 passes through a wall 68 of the valve 24, through an aperture 70, in which a seal 72 is circumferentially disposed around the rod. The seal 72 acts as an air seal between the chamber 30 and the chamber 58.

The chamber 30 is in fluid communication with the chamber 58 through a passage 74. A metering screw 76 is disposed in a portion of the passage 74 and serves to control the rate of air flow between the passage 30 and the passage 58. A flapper valve 77 is disposed through the wall 68 and serves to equalize the pressure between the pressurizable chamber 58 and the air chamber 30.

In operation, the air pump 10 maintains a preset pressure in the accumulator 12. The foot-operated valve 16 is depressed to permit an air pressure to be communicated from the accumulator 12 to the brake actuator 14. For purposes of this illustration, it will be assumed that the metering screw 76 is set to allow an air flow less than the maximum carrying capability of the passage 74. Therefore, as the foot-operated valve 16 is partially opened, there will be substantially free air flow from the inlet 28 to the outlet 32. Under these conditions, normal braking is accomplished.

If the valve 16 is suddenly opened, a surge of pressure will be directed through the inlet 28. Pressure will likewise flow through the passage 74 into the pressurizable chamber 58 moving the diaphragm 56 rightwardly as viewed in FIGURE 1.

Figure 2:
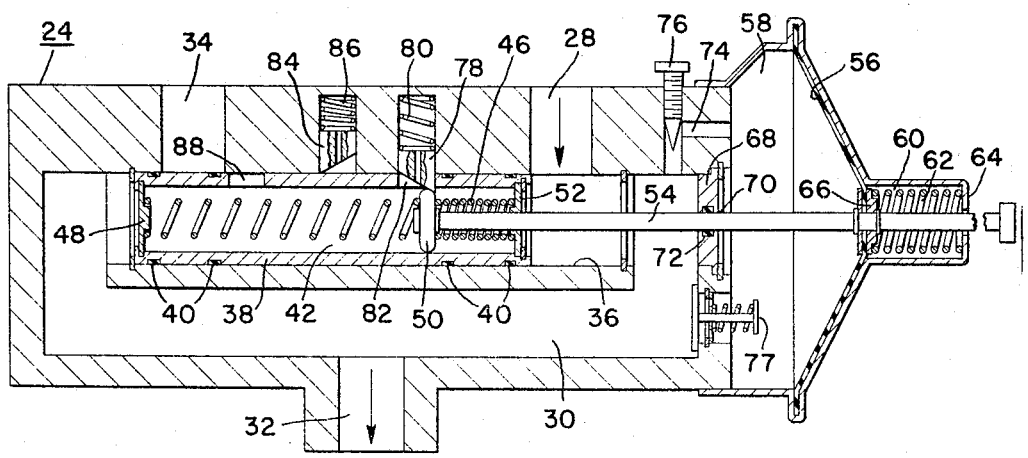
FIGURE 2 is a sectional view of the subject invention, the valve shown in one extreme of movement.

Referring now to FIGURE 2, when the chamber 58 is fully pressurized and the spring 62 is compressed against the wall 64, the rod 54 is carried to one extreme of movement. The disk 50 carried by the rod 54 will completely compress the spring 46 and, in its travel to the extreme of movement, will depress a latch 78. The latch 78 is normally biased by a spring 80 into an aperture 82 formed in the outer periphery of the piston 38 which serves to lock the piston 38 in one extreme of translational movement. The movement of the disk 50 across the tapered surface of the latch 78 will free the piston 38 and the compressed spring 46 will drive the piston 38 very rapidly into one extreme of movement in the cylinder 36. While disposed in this extreme of movement, the inlet 28 will be sealed and no further pressure build-up will occur in the air chamber 30 or in the pressurizable chamber 58. As this occurs, the piston 38 is drawn out of sealing engagement with the exhaust 34 and the air chamber 30 is thereby opened to the atmosphere. As pressure is lost in the air chamber 30, the flapper valve 78 will go to an open position and pressure will be lost in the chamber 58 also.

It should be noted that, as the piston 38 moved to the right, as viewed in FIGURE 2, a latch 84, biased by a spring 86 toward the outer periphery of the piston 38, drops into an aperture 88 in the outer periphery of the piston 38, thereby inhibiting movement of the piston 38 in the opposite direction.

Figure 3:
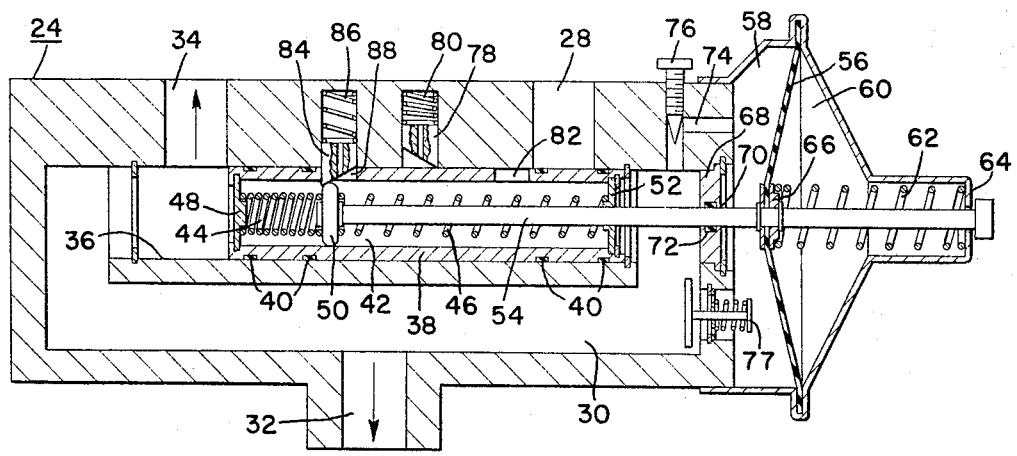
FIGURE 3 is a sectional view of the subject invention, the valve shown in another extreme of movement.

Referring now to FIGURE 3, the flapper valve 78 is shown in the open position and the exhaust 34 is illustrated clear of the sealing rings 40 and, therefore, open to atmosphere. The spring 62 is of greater strength than the spring 46 and, as pressure is released from the chamber 58 and the diaphragm 56, the spring 62 will drive the diaphragm 56 leftwardly, as viewed in FIGURE 3. The rod 54, being in fixed relationship with respect to the diaphragm 56, is driven toward the left and the disk 50, carried by the rod 54, compresses the spring 44 against the closure means 48 of the piston 38. As the disk 50 moves, it engages the lower surface of the latch 84 driving the latch 84 out of the aperture 88, thereby freeing the piston 38 for translational movement in the direction of movement of the rod 54.

The compressed spring 44 tends to move the freed piston 38 very rapidly to another extreme of movement in the cylinder 36 into a position where the exhaust 34 is again sealed. The inlet 28, at the same time, is opened and air pressure is again fed through the inlet 28 into the chamber 30 and the pressurizable chamber 58. The cycle just described takes place very rapidly and results in an intermittent pressure impulse being fed to the brake actuator 14. In this manner, the brake shoes 20 are prevented from being locked with respect to a rotating drum 90.

It is apparent that the rate of cycling and the pressure at which the cycling begins can be regulated for a given installation by a change in an adjustment of the metering screw 76 or by varying the compression of the spring 62 respectively. In a typical installation where the valve described serves as an anti-skid device in a vehicle braking system, it would be desirable to allow the valve to pass air pressures which would not tend to lock the brakes. Therefore, during normal brake actuation, the valve would not cycle and an amount of air pressure that would not tend to lock the vehicle brakes would be passed. As previously stated, this pressure would vary between vehicles having different loading characteristics. It is obvious that the degree to which the metering screw 76 restricts the passage 74 will determine the cycling frequency of the air valve.

It is equally obvious that the strength of the spring 62 relative to the springs 44 and 46 will determine the pressure at which cycling takes place given a certain flow. Pressure surges are dampened and the device is not over-responsive. The diaphragm is resilient and aids in the dampening as does the restriction of the flow into the chamber adjacent the diaphragm. Again, the desired response to the valve will be dictated by vehicle loading and anticipated road conditions.

It would be possible to regulate the compression of the spring 62 in the static condition to regulate the repsonse of the valve as road conditions vary. It is equally obvious that, as a vehicle is traveling from one point to another and a road condition change manifests itself, the compression of spring 62 could be varied by remotely controlling the compression of the spring in any manner known in the art.

The utility of the present invention is apparent in an environment where it is adapted to prevent wheel lock-up and subsequent skidding of the vehicle. However, uses of the valve might be made in an operative environment where a pressure delay is desirable between a pressure source and pressure operable apparatus. Within the bounds of the adjustment capabilities previously described, any type of pressure surge above a preset pressure can be utilized to start the valve, herein described, cycling.

While the embodiment of the present invention, as herein disclosed, constitutes a preferred form, it is to be understood that other forms might be adopted.

What is claimed is as follows:

1. An anti-skid device for an air-operated braking system, said device comprising: a chamber; inlet means from a pressure source into said chamber; outlet means from said chamber to a fluid operable device; exhaust means from said chamber to the atmosphere; force responsive means reacting to force differentials placed thereon to move translationally; and valve means mounted independent of said force responsive means and operable by said pressure responsive means through a lost motion connection between said force responsive means and said valve means when said force responsive means moves a predetermined distance to selectively route pressure from said inlet means to said outlet means and from said outlet means to said exhaust means thereby preventing the air-operated braking system from being constantly responsive to pressure from said pressure source.

2. An anti-skid device for an air-operated vehicle braking system, said device comprising; an air chamber; inlet means from a pressure source into said air chamber; outlet means from said air chamber to air-operated vehicle brakes; exhaust means from said air chamber to the atmosphere; force responsive means adapted to react to pressure increases in said inlet means above a predetermined limit and to pressure in said air chamber; and valve means mounted independent of said force responsive means and slidably disposed in said air chamber and adapted to be moved by said force responsive means through a lost motion connection between said force responsive means and said valve means to selectively seal the inlet means from the outlet means during a condition of pressure build-up in the inlet means above predetermined limits, said valve means being adapted to selectively seal the exhaust means from the inlet means during a condition of gradual pressure build-up in the inlet means under predetermined limits and to dampen pressure surges, said valve means thereby routing gradual pressure increases to the vehicle braking system directly and dampening pressure surges to prevent vehicle brake lock-up and consequent skidding of the vehicle.

3. An anti-skid device of the type described in claim 2 wherein the force responsive means is a spring loaded diaphragm disposed at one end of the air chamber forming a separate chamber responsive to pressure from the inlet means during one condition of operation and responsive to pressure at the outlet means during another condition of operation.

4. An anti-skid device of the type described in claim 2 wherein the valve means is a piston slidable in the air chamber between one extreme of movement where it blocks the inlet means and another extreme of movement where it blocks the exhaust means, said piston being driven to either extreme of movement by the force responsive means through said lost motion connection.

5. An anti-skid device having a valve means of the type described in claim 4 wherein said valve means and said lost motion connection comprises; a substantially hollow cylinder, a plurality of springs disposed in end-to-end relationship in said hollow cylinder, a rod carried by said pressure responsive means and extending into said hollow cylinder, latching means having portions extendable through a wall of the hollow cylinder to maintain the valve means in either extreme of movement, and a spool carried by said rod and disposed between said springs, said spool being adapted to first depress one of the springs during sliding movement of the valve means and later release a latching means to allow rapid sliding movement of the valve means to one extreme of sliding movement where the inlet means is blocked, said spool being adapted to first depress another of the springs during movement of the valve means in an opposite direction and later release a latching means to allow rapid sliding movement of the valve means to a second extreme of sliding movement where the exhaust means is blocked.

6. An air metering system comprising: an air pressure source; pressure operable means in fluid communication with said air pressure source; and flow regulating means including a valve means pressure responsive means, said valve means being mounted independent of said pressure responsive means, and means for moving said valve means including a lost motion connection between said pressure responsive means and said valve means to selectively position said valve means alternately to interrupt and reestablish free fluid communication between said air pressure source and said pressure operable means as pressure from said air pressure source exceeds certain predetermined limits.

7. A valve for a fluid operable system, said valve comprising: a valve body, an inlet port, an outlet port and an exhaust port from said valve body; pressure responsive means in fluid communication with said inlet; and piston means mounted independent of said pressure responsive means and operatively responsive to said pressure responsive means through a lost motion connection to selectively alternate fluid communication between said exhaust port and said outlet port as inlet pressure exceeds predetermined limits thereby regulating fluid pressure available to said outlet port from said inlet port.

References Cited by the Examiner
UNITED STATES PATENTS 2,907,607  10/1959  Williams _____ 303—24

FOREIGN PATENTS 1,050,925  1/1954  France.

BENJAMIN HERSH, Primary Examiner.

EUGENE G. BOTZ, Examiner.

M. S. SALES, Assistant Examiner.